(12) United States Patent
Elkouh et al.

(10) Patent No.: US 6,833,334 B1
(45) Date of Patent: Dec. 21, 2004

(54) FLEXIBLE CORROSION-INHIBITING COVER FOR A METALLIC OBJECT

(75) Inventors: Nabil A. Elkouh, Meriden, NH (US); Bruce R. Pilvelait, Charlestown, NH (US)

(73) Assignee: Creare Inc., Hanover, NH (US)

(*) Notice: Subject to any disclaimer, the term of this patent is extended or adjusted under 35 U.S.C. 154(b) by 117 days.

(21) Appl. No.: 10/232,241

(22) Filed: Aug. 30, 2002

Related U.S. Application Data

(63) Continuation of application No. 09/557,845, filed on Apr. 26, 2000, now Pat. No. 6,444,595.

(51) Int. Cl.$^7$ ............................. B32B 27/12; B32B 5/26
(52) U.S. Cl. ......................... 442/76; 442/86; 442/268; 442/289; 442/417
(58) Field of Search .................... 442/76, 86, 268, 442/289, 417, 121, 118, 301; 428/305.5, 317.9

(56) References Cited

U.S. PATENT DOCUMENTS

| | | | |
|---|---|---|---|
| 3,936,560 A | 2/1976 | Santurri et al. | 428/219 |
| 4,034,375 A | 7/1977 | Wallin | 343/18 |
| 4,194,041 A | 3/1980 | Gore et al. | 428/315 |
| 4,467,005 A | 8/1984 | Pusch et al. | 428/111 |
| 4,529,633 A | 7/1985 | Karlsson | 428/102 |
| 4,659,602 A | 4/1987 | Birch | 428/88 |
| 4,673,402 A | 6/1987 | Weisman et al. | 604/368 |
| 4,684,785 A | 8/1987 | Cole | 219/212 |
| 4,699,620 A | 10/1987 | Bernardin | 604/385 |
| 5,149,336 A | 9/1992 | Clarke et al. | 604/388 |
| 5,153,045 A | 10/1992 | Lofgren | 428/95 |
| 5,374,260 A | 12/1994 | Lemay et al. | 604/378 |
| 5,466,232 A | 11/1995 | Cadieux et al. | 604/378 |
| 5,565,139 A | 10/1996 | Walker et al. | 252/194 |
| 5,599,335 A | 2/1997 | Goldman et al. | 604/368 |
| 5,599,336 A | 2/1997 | Plischke | 604/368 |
| 5,736,231 A | 4/1998 | Todt | 428/198 |
| 5,770,086 A | 6/1998 | Indriksons et al. | 210/643 |
| 5,830,201 A | 11/1998 | George et al. | 604/364 |
| 5,849,405 A | 12/1998 | Wang et al. | 428/304.4 |
| 5,885,912 A | 3/1999 | Bumbarger | 442/239 |
| 5,941,862 A | 8/1999 | Haynes et al. | 604/368 |
| 6,011,195 A | 1/2000 | Muhs et al. | 604/367 |
| 6,011,196 A | 1/2000 | Wang et al. | 604/368 |
| 6,028,160 A | 2/2000 | Chandler et al. | 528/176 |
| 6,051,317 A | 4/2000 | Brueggemann et al. | 428/378 |
| 6,100,208 A | 8/2000 | Brown et al. | 442/364 |

*Primary Examiner*—Ula C. Ruddock
*Assistant Examiner*—Jenna-Leigh Befumo
(74) *Attorney, Agent, or Firm*—Downs Rachlin Martin PLLC

(57) ABSTRACT

A cover (200) for inhibiting corrosion of a metallic object over which the cover is placed. The cover has an inner surface (104) defined by a liquid-permeable layer (202) and an outer surface (102) defined by a liquid-impermeable layer (204). A moisture-absorbing layer (206) is sandwiched between the liquid-permeable layer and the liquid-impermeable layer. The liquid-permeable layer allows vapor and liquid moisture beneath the cover to be absorbed into the moisture-absorbing layer to reduce the amount of moisture beneath the cover. The liquid-impermeable layer repels environmental liquid moisture, such as rain, sea spray, dew and the like and prevents such moisture from penetrating the cover. A radar-influencing layer (308) and vapor corrosion inhibitors (214) may be included in the cover. A method of protecting an object is also disclosed. The method includes covering a metallic object with cover (200).

13 Claims, 3 Drawing Sheets

FLEXIBLE CORROSION-INHIBITING COVER FOR A METALLIC OBJECT

This application of U.S. application Ser. No. 09/557,845, filed on Apr. 26, 2000, now U.S. Pat. No. 6,444.595, the entire disclosure of which is incorporated by reference into this application.

This invention was made with Government support under contract N00024-99-C4107 awarded by the U.S. Navy. The Government has certain rights in the invention.

FIELD OF THE INVENTION

The present invention generally relates to the field of covers for protecting materials from environmental elements. More particularly, the present invention is directed to a flexible cover that actively inhibits the corrosion of a metallic object on which the cover is placed.

BACKGROUND OF THE INVENTION

Corrosion and corrosion mitigation have become increasingly important for economic and safety reasons. Based on estimates made in the mid 1990's, overall costs attributable to corrosion account for over $100 billion a year in the United States alone. These costs typically account for only the direct costs of corrosion and do not include the associated indirect costs, such as safety, plant downtime, loss of product, contamination and over-design.

Corrosion is defined as the destructive result between a metal alloy and its environment. Nearly every metallic corrosion process involves the transfer of electronic charge in aqueous solution, and most corrosion reactions take place in the presence of water in either liquid or condensed vapor phases and also in high humidity.

Corrosion is particularly a problem in marine environments, such as shipboard, off-shore drilling rigs, coastal regions and the like, where seawater enhances corrosion reactions due to increased ion transport, pH effects and elevated dissolved oxygen levels in turn enhance levels of hydrogen ions. Corrosion reactions are further accelerated in marine environments by contaminants, such as chloride ions, present in seawater. Corrosion damage to equipment stored and used in marine environments is a tremendous problem, impacting maintenance costs, availability, repair and reliability.

Equipment stored, for example, onboard a ship or in coastal regions, is often stored in protective storage systems that have proved to be less than optimally effective. At best, such equipment is covered with waterproof tarpaulins, although often, especially for shipboard equipment, it is not stored properly and is directly exposed to a marine environment, which leads to rapid corrosion. Even when equipment is covered by waterproof tarpaulins, seawater still penetrates through and/or around the tarpaulins into the protected spaces where it collects and corrodes the underlying equipment. Also, conventional storage systems can be cumbersome to use and maintain, and are often avoided. As a result, corrosion continues to be a significant and costly problem, requiring many hours of rust removal, painting and repair that lead to premature equipment replacement.

FIG. 1 shows a conventional waterproof cover 20 used to protect metallic objects, such as metallic block 22 shown resting on a surface 24, from moisture, such as rain, sea spray, dew and the like. Cover 20 has an outer surface 26, an inner surface 28 and an area 30 defined by a peripheral edge 32. Cover 20 is shown covering block 22 in a typical manner, wherein a micro-environment, is generally defined by the space enclosed by cover 20. The micro-environment comprises a number of interior regions, such as regions 34, located between cover 20 and block 22.

Generally, prior art covers comprise at least one liquid-impermeable layer made of, for example, a tightly-woven polymer fabric. More complex prior art covers may include one or more additional layers that provide the inner surface with a non-abrasive texture to minimize mechanical damage to the object covered. Other prior art covers are made of vapor-permeable materials, such as expanded polytetrafluoroethylene or the like.

Interior regions 34 generally never have a moisture content less than that of the ambient environment. If the moisture content of the ambient environment rises, the moisture content of regions 34 also rises due to the inflow of moisture (illustrated by arrow 36) through gaps between cover 20 and surface 24 at peripheral edges 32. Eventually, the moisture content of the ambient environment 38 and regions 34 equalize. Once the additional moisture is in the micro-environment, it can become trapped, as illustrated by arrows 40. Moisture levels can quickly become elevated and the air saturated. In such a case, condensation could occur on the block 22. Because the moisture content of interior regions 34 never falls below that of ambient environment 38, prior art covers are not very effective in high moisture environments, such as marine and high-humidity environments. Moreover, once moisture enters the micro-environment, it can take a long time to dissipate, if at all.

SUMMARY OF THE INVENTION

The present invention is directed to a cover for inhibiting corrosion of a metallic object. The cover includes a first layer having a first face and a second face. The first layer comprises a super-absorbent material adapted to absorb and store moisture. A second layer is located adjacent the first face of the first layer. The second layer is liquid permeable. A third layer is located adjacent the second fare of the first layer. The third layer is liquid-impermeable. A radar-influencing layer is located within or adjacent at least one of the first layer, second layer and third layer. The radar-influencing layer comprises a radar-influencing material.

In another aspect, the cover of the present invention includes a first layer having a first face and a second face. The first layer comprises a super-absorbent material adapted to absorb and store moisture. A second layer is located adjacent the first face of the first layer. The second layer is liquid permeable. A third layer is located adjacent the second face of the first layer. The third layer is liquid-impermeable. A vapor corrosion inhibitor layer is located within or adjacent at least one of the first layer, second layer and third layer. The vapor corrosion inhibitor layer comprises a vapor corrosion inhibitor.

In yet another aspect, the cover of the present invention includes a panel having a first face, a second face and a peripheral edge. The panel includes a first layer having a first face and a second face. The first layer comprises a super-absorbent material adapted to absorb and store moisture. A second layer is located adjacent the first face of the first layer. The second layer is liquid permeable. A third layer is located adjacent the second face of the first layer. The third layer is liquid-impermeable. The panel includes a fastening means located adjacent the peripheral edge adapted to removably fasten said panel to a similar panel.

The invention is also directed to a method of inhibiting corrosion on a metallic object. First, a cover is provided. The cover includes a first layer having a first face and a second face. The first layer comprises a super-absorbent material adapted to absorb and store moisture. A second layer is located adjacent the first face of the first layer. The second layer is liquid permeable. A third layer is located adjacent the second face of the first layer. The third layer is liquid-impermeable. Next, at least a portion of the metal object is covered with the cover such that the second layer faces the object.

BRIEF DESCRIPTION OF THE DRAWINGS

For the purposes of illustrating the invention, the drawings show a form in which the invention may be embodied. It should be understood, however, that the invention is not limited to the precise arrangements and instrumentalities shown.

DETAILED DESCRIPTION OF THE INVENTION

Figure 1:
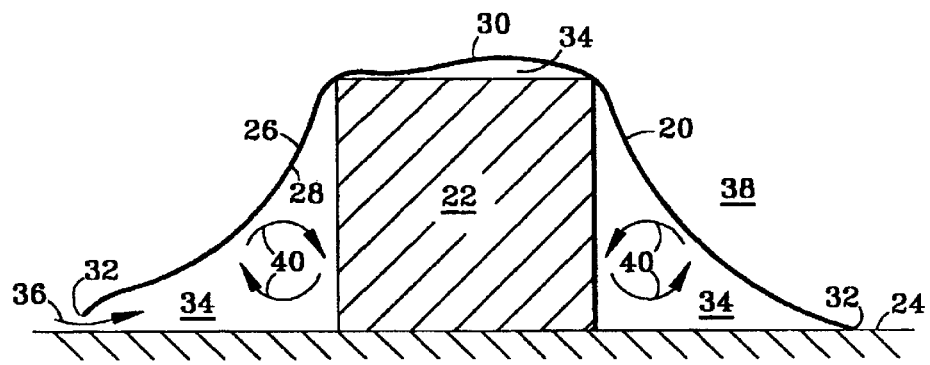
FIG. 1 is a cross-sectional view of a prior art cover shown covering an object.
Figure 2:
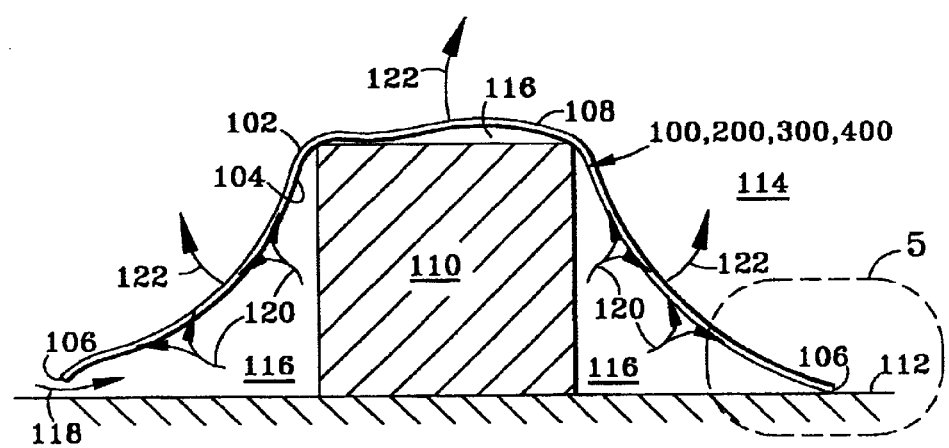
FIG. 2 is a cross-sectional view of a corrosion inhibiting cover of the present invention shown covering an object.

Referring now to the drawings, wherein like numerals indicate like elements, FIG. 2 illustrates a corrosion-inhibiting cover, which is generally denoted by the numeral 100. Cover 100 is preferably made of flexible materials and includes an outer surface 102 and an inner surface 104. In some cases rigid materials, often formed with a configuration corresponding to that of the object to be covered, may be used for cover 100. Cover 100 has a peripheral edge 106 that defines an area 108, which may be shaped as desired to suit a particular application. When draped over an object, such as a metallic block 110 resting on a surface 112, outer surface 102 is exposed to an ambient environment 114 and inner surface 104 defines a micro-environment comprising a number of interior regions, such as those denoted as 116, located between inner surface 104 and block 10.

Although metallic block 110 is generally protected from elements present in ambient environment 114 by cover 100, moisture from ambient environment 114 tends to infiltrate (as illustrated by arrow 118) interior regions 116 through gaps between peripheral edge 106 of cover 100 and surface 112. However, the materials and structure of cover 100 allow it to absorb and store such infiltrating moisture (as illustrated by arrows 120) from within interior regions 116 and maintain the moisture content of the micro-environment at a low level, below that of ambient environment 114. Cover 100 is also able to absorb and store by wicking action any water present on the surface of block 110 that comes into contact with inner surface 104. This low-moisture micro-environment inhibits metallic block 110 from corroding. In addition to the ability to absorb and store moisture, cover 100 may be provided with the ability to passively regenerate its moisture-absorbing and storing features by allowing stored moisture to diffuse to the outer surface of the cover, where it can evaporate (as illustrated by arrows 122) into ambient environment 114 when conditions there are suitable for evaporation.

Beneficial features of the flexible cover 100 of the present invention are that it can be made to any size and shape necessary to protect an object having virtually any size and surface profile. Some diverse examples of such objects are containers for container ships, deck-mounted guns on naval ships, construction equipment, stored construction materials, air conditioning units and barbeque grills, to name just a few. Pouches of flexible cover 100 could be fashioned to store munitions, tools, handguns and telephones and other electronic devices to name just a few. One skilled in the art will recognize that there is a vast range of applications for cover 100.

Figure 3:
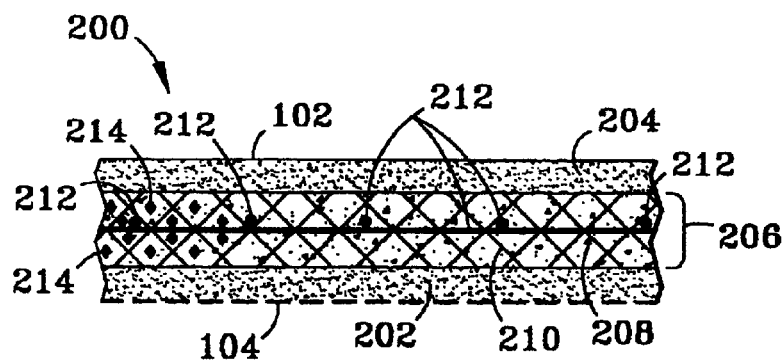
FIG. 3 is a cross-sectional view of a portion of one embodiment of the corrosion inhibiting cover of the present invention.

Referring now to FIG. 3, there is shown one specific embodiment of corrosion-inhibiting cover 100 of the present invention, which is identified at 200. Cover 200 comprises three layers consisting of a liquid-permeable layer 202, a liquid-impermeable layer 204 and a moisture-absorbing layer 206 sandwiched between liquid-permeable layer 202 and liquid-impermeable layer 204. With reference to FIGS. 2 and 3, liquid-permeable layer 202 forms inner surface 104 of cover 200 and retains the constituent materials of moisture-absorbing layer 206 within cover 200. Liquid-permeable layer 202 is vapor permeable to allow moisture vapor within interior regions 116 to reach moisture-absorbing layer 206, and liquid-permeable to allow any liquid water contacting inner surface 104 of cover 200 to be wicked into moisture-absorbing layer 206. Preferably, liquid-permeable layer 202 has a water transmission rate of greater than 10 $g/m^2$-hr. Liquid-permeable layer 202 should be made of a durable woven or non-woven material that can withstand repeated use and continual contact with a wide variety of surfaces. It is also preferable that liquid-permeable layer 202 be relatively smooth and/or soft so that damage to any object contacted by liquid-permeable layer 202 is avoided. A preferred material for liquid-permeable layer 202 is polyester mesh Style No. 9864, available from Fablock Mills, Murry Hill, N.J. Other suitable materials include nylon, polypropylene, or the like and are available from Fablock Mills Inc., Murry Hill, N.J., Jason Mills Inc., Westwood, N.J., and Apex Mills, Inwood, N.Y. among others.

Moisture-absorbing layer 206 includes a fiber matrix 210 and a super-absorbent material 208, such as hydrogel. Preferably, the super-absorbent material 208 is in particulate or fiber form, which allows it to be dispersed throughout the fiber matrix. Alternatively, however, super-absorbent material 208 may be located in a generally discrete layer within fiber matrix 210, which may comprise either a woven or non-woven material. Examples of acceptable materials for fiber matrix 210 include wool, fiberglass, polymer fleece, fluff wood pulp and the like. It is desirable that fiber matrix 210 have a high capillarity, preferably greater than 10 $g/m^2$-hr., so that moisture coming into contact with moisture-absorbing layer 206 through liquid-permeable layer 202 may be wicked deep into moisture-absorbing layer 206 to take advantage of the super-absorbent material located there. Although a fiber matrix is shown, it may be eliminated in an alternative embodiment having a hydrogel or other super-absorbent material in a form that need not be supported by and/or located within a fiber matrix.

Hydrogel, one example of a class of super-absorbent materials, is capable of absorbing up to 400 times its weight in water. With such a large absorption capability, the particles of hydrogel can swell to many times their original size. If the hydrogel particles are not distributed properly throughout fiber matrix 210, moisture-absorbing layer 206 may experience hydroblocking, wherein the hydrogel particles closest to the moisture source swell so much that they block moisture from being wicked farther into the fiber matrix. Although some of the absorbed moisture eventually reaches the hydrogel located deep within fiber matrix 210 by diffusion, diffusion is a slow process that would degrade the usefulness of a cover experiencing hydroblocking, particularly in high-moisture conditions. Therefore, care must be taken to distribute super-absorbent material 208 within fiber matrix 210 in a manner such that when the super-absorbent material adjacent the mesh layer is saturated, the fiber matrix is still able to wick water deeper into the moisture-absorbing layer.

Liquid-impermeable layer 204 defines outer surface 102 of cover 200 and prevents liquid in ambient environment 114, such as rain, sea spray, dew and the like, from reaching interior regions 116 beneath the cover. It is preferable, however, that liquid-impermeable layer 204 be vapor-permeable material to allow moisture stored in moisture-absorbing layer 206 to escape into ambient environment 114 by diffusion and evaporation as described above. Preferably, liquid-impermeable layer 204 has a vapor transmission rate of greater than 1 $g/m^2$-hr. The liquid transmission rate through the liquid-impermeable layer 204 should be less than the employed vapor transmission rate for the liquid impermeable layer. For the stated lower bound of 1 $g/m^2$-hr. of vapor transmission through the liquid-impermeable layer 204, a liquid transmission rate through the liquid-impermeable layer 204 could be any value less than 1 $g/m^2$-hr. If the vapor transmission rate were greater, the corresponding acceptable level of liquid transmission would be greater, as long as it remained less than the vapor transmission rate. By allowing stored moisture to escape, cover 200 is capable of regenerating itself during periods of low ambient moisture so that it is capable of storing more moisture during a subsequent period when interior regions 116 again become moisture laden. Beneficially, the liquid-impermeable layer should also be able to absorb solar energy to provide heat to cover 200 that accelerates regeneration of moisture-absorbing layer 206.

Liquid-impermeable layer 204 may comprise a woven material, a non-woven material or a combination of the two. A preferred vapor-permeable material for liquid-impermeable layer 204 is a laminate of 200 denier nylon inner layer and a breathable urethane outer layer, available from LAMCOTEC Incorporated, Monson, Mass. Other vapor-permeable materials, such as expanded polytetrafluroethylene, GORE-TEX® fabric (W. L. Gore & Associates, Inc., Newark, Del.), SUNBRELLA® fabric (Glen Raven Mills Inc., Glen Raven, N.C.), Hub Semi-Permeable fabric (Hub Fabric Leather Company, Everett, Mass.) or the like, may alternatively be used.

In an alternative embodiment, cover 200 may further include a heating element 212 that would allow moisture-absorbing layer 206 to regenerate more quickly or regenerate when the conditions in ambient environment 114 would otherwise not permit evaporation of the stored moisture. Such a heating element may comprise an electrical resistance wire grid located within one of the layers or between adjacent layers. Alternatively, the heating element may comprise arrays of thin, flexible heating elements consisting of etched-foil resistive elements laminated between layers of flexible insulation like KAPTON®, NOMEX®, silicone rubber, or mica, or arrays of thin film ceramic elements available from Minco Products Incorporation, Minneapolis, Minn. and Watlow Gordon, Richmond, Ill. among others (KAPTON® and NOMEX® are registered trademarks of E.I. DuPont de Nemours and Company, Wilmington, Del.).

In another alternative embodiment, the cover may further include a Vapor Corrosion Inhibitor (also known as "Volatile Corrosion Inhibitor") (VCI) 214 incorporated into one or more of layers 202, 204 and 206, preferably in the fiber matrix the moisture-absorbing layer, or into an additional layer. VCIs 214 are volatile compounds that emit ions that condense on metallic surfaces to form a mono-molecular layer that interacts with corrosion agents to protect the surface. VCIs 214 are continuously self-replenishing and environmentally benign. Examples of VCIs that may be used with the cover of the present invention include mixtures of materials selected from amine salts, animonium benzoate, triazole derivatives, alkali dibasic acid salts, alkali nitrites, tall oil imidazolines, alkali metal molybdates, and the like which can be supplied by Cortec Corporation, St. Paul, Minn., Daubert Coated Products Incorporated, Westchester, Ill., Poly Lam Products, Buffalo, N.Y., Mil-Spec Packaging of Georgia Incorporated, Macon, Ga., and James Dawson Enterprises Limited, Grand Rapids, Mich., among others.

The addition of a VCI 214 to cover 200 enhances the corrosion inhibiting ability of the cover by allowing the cover to continue to provide protection when the moisture-absorbing layer is overwhelmed. In addition, the VCI 214 benefits from moisture-absorbing layer 206 because the moisture-absorbing layer removes the burden from the VCI by not requiring it to offer protection at all times. One or more VCIs may be added to any embodiment of the cover of the present invention, such as those shown in FIGS. 4–7.

The layers of cover 200 are preferably bonded to one another throughout area 108 of cover 200 in a manner that does not interfere with its liquid and vapor transport features, yet retains the layers in physical proximity to one another. Bonding processes known in the art may be used to bond or join the layers of cover 200. Bonding processes such as thermal bonding or multi-component adhesive bonding could be used to bond individual layers or the entire cover 200. Other bonding processes known in the art, however, may be used.

Alternatively, the layers may be secured to one another by other means such as stitching. Depending on the size and materials of the cover, it may only be necessary to provide stitching adjacent peripheral edge 106. Otherwise, it may be necessary to provide quilt-stitching throughout the area. In a further alternative embodiment, liquid-impermeable layer 204 may be removably secured to the other two layers 202 and 206 to allow it to be removed to speed regeneration of the moisture-absorbing layer. Re-fastenable fasteners, such as hook-and-loop fasteners, snaps, zippers and the like, may be provided to facilitate this feature. Additionally, the moisture-absorbing layer 206 could be bonded or formed via an airlaid process known in the art as a process of producing a nonwoven web of fibers in sheet form where the fibers are transported and distributed via air flows where the entire sheet is then set with a mixture of binders and resins.

Figure 4:
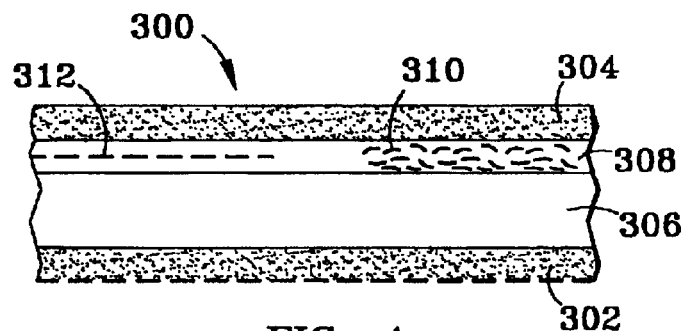
FIG. 4 is a cross-sectional view of a portion of an alternative embodiment of the corrosion inhibiting cover of the present invention.

FIG. 4 shows another specific embodiment of corrosion inhibiting cover 100 of the present invention, which is identified at 300. Cover 300 comprises the three basic layers of cover 200, shown in FIG. 3, i.e., a liquid-permeable layer 302, a liquid-impermeable layer 304 and a moisture-absorbing layer 306 (these layers being identical, respectively, to layers 202, 204 and 206). In addition to these layers, cover 300 further includes a radar-influencing layer 308. Radar-influencing layer 308 may comprise a radar-absorbing material 310, a radar-reflecting material 312 or a combination of both, depending upon the desired radar profile of cover 300. With reference to FIG. 2, it may be preferable to have entire area 108 of cover 300 be radar-attenuating. For example, in a military application it may be necessary to reduce the radar profile of a large object to conceal its identity. On the other hand, it may be preferable to have entire area 108 be radar-enhancing. For example, in a civilian application it may be advantageous to increase the radar profile of a small water craft to accentuate its presence. In another instance, it may be desirable to provide area 108 with alternating discrete radar-attenuating and radar-enhancing regions to give the cover a custom radar profile.

Although radar-influencing layer 308 is shown located between liquid-impermeable layer 304 and moisture-absorbing layer 306, it may be located elsewhere. For example, the radar-influencing layer may be located between moisture-absorbing layer and the liquid-permeable layer, adjacent outer surface 102 of cover 200 or the like. In addition, radar-absorbing material 310 and radar-reflecting material 312 may be incorporated into one or more of liquid-permeable layer 304, moisture-absorbing layer 306 and liquid-permeable layer 302. Care must be taken, however, to select a material that does not interfere with the vapor and liquid transport features of cover 300.

Radar-absorbing material 310, may comprise polypyrrole-coated polyester fibers or the like which may be made into a thread that is then woven into a discrete fabric layer or the outer layer. Such textiles are available from Milliken & Co., Spartanburg, S.C. under the trademark CONTEX®. Alternatively, radar-absorbing material 310 may comprise discrete particles of graphite or the like dispersed within the fiber matrix or within a coating that is applied to liquid-impermeable layer 304 or is applied to a separate layer that is then incorporated into the cover. Other examples of radar-absorbing materials are REX radar-absorbing mats (Milliken & Co., Spartanburg, S.C.) and RFWP Weatherproof Foan (R&F Products, Inc., San Marcos, Calif.). Similar techniques may be used for radar-reflecting material 312, except that a metal or the like, which may be provided as a thread or as discrete particles is incorporated into one or more layers of cover 300.

Figure 5:
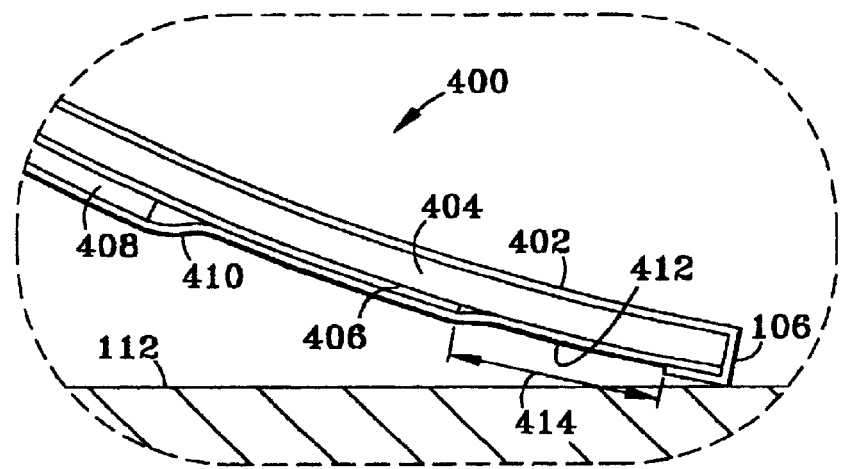
FIG. 5 is a enlarged view of one edge of the cover shown in FIG. 2, for one specific embodiment of hte present invention.

Referring now to FIGS. 2 and 5, there is shown yet another corrosion inhibiting cover 100 of the present invention, which is identified at 400. In FIG. 5, cover 400, which has a five layer construction, is shown with its peripheral edge 106 contacting surface 112, such as a ship's deck, a tarmac or the like. In such applications, it is common for a large amount of liquid water to be absorbed by cover 400 at regions adjacent peripheral edge 106. This is so because much of the water from ambient environment 144, such as rain, sea spray, dew and the like, repelled by area 108 travels down the sloping portions of cover 400, ending up adjacent peripheral edge 106. In order to prevent saturation of cover 400 in regions adjacent peripheral edge 106, additional layers may be added to the basic three layer structure of FIG. 3 to provide a separate zone for absorbing and storing moisture that may accumulate on surface 112.

Accordingly, cover 400 includes an outer liquid-impermeable layer 402, a first moisture-absorbing layer 404, an intermediate liquid-impermeable layer 406, a second moisture absorbing layer 408 and a liquid-permeable layer 410, which are located adjacent one another in the named order, except at a stepped region adjacent peripheral edge 106. The primary purpose of outer liquid-impermeable layer 402 is to prevent liquid water, such as rain, sea spray, dew and the like, from penetrating into the micro-environment beneath cover 400. Outer liquid-impermeable layer 402 includes a return to provide a robust structure at peripheral edge 106. The primary function of first moisture absorbing layer 404 is to absorb and store moisture that collects on surface 112, whereas the primary function of second moisture absorbing layer 408 is to absorb and store moisture trapped in the micro-environment beneath cover 400.

Intermediate liquid-impermeable layer 406 prevents liquid moisture stored in each of the moisture-absorbing layers from migrating to the other of such layers. At regions adjacent peripheral edge 106, this separation prevents second moisture-absorbing layer 408 from becoming over-burdened by moisture from surface 112. Preferably, both liquid-impermeable layers are vapor permeable to allow cover 400 to passively regenerate by losing stored moisture to ambient environment 114 when conditions there permit.

Peripheral edge 106 of the intermediate liquid-impermeable layer 406 is laterally spaced from peripheral edge 106 around the entire periphery of cover 400 to define an opening 412. When cover 400 is draped over an object, such as metallic block 110, opening 412 contacts or is slightly spaced from surface 112, allowing any moisture present on surface 112 to be wicked into first moisture-absorbing layer 404. Depending on design parameters, such as materials selected, volume of moisture to be absorbed and the like, the width 414 of opening 412 may be varied accordingly.

Figure 6:
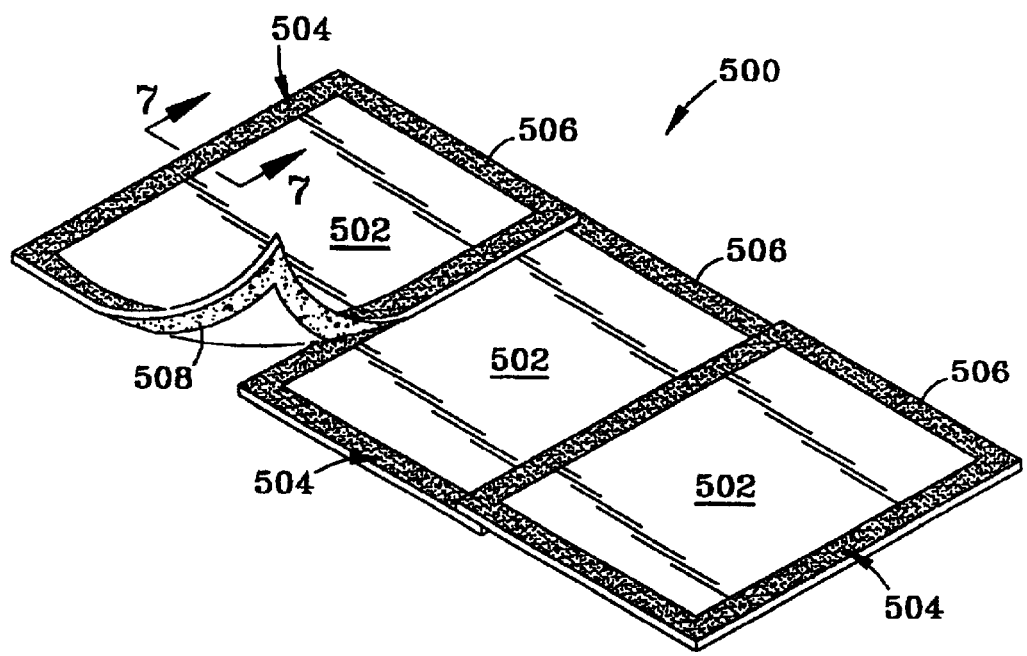
FIG. 6 is a perspective view showing an embodiment of the corrosion inhibiting cover of the present invention comprising a plurality of panels removably secured to one another.
Figure 7:
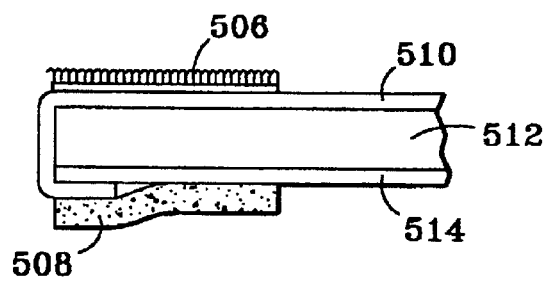
FIG. 7 is an enlarged cross-sectional view of one of the peripheral edges of one of the panels taken along line 7—7 of FIG. 6.

FIGS. 6 and 7 show a corrosion inhibiting cover 500 according to the present invention, wherein cover 500 is panelized into a number of discrete panels, each denoted 502, and having an outer surface, an inner surface and a peripheral edge. Panels 502 are removably secured to one another, and are removably securable to other panels (not shown) of similar construction, with fasteners 504 located adjacent the peripheral edge of cover 500. Panelization allows cover 500 of the present invention to be assembled to fit the size and shape necessary for a particular application. To further enhance customization, one or more of the panels may be formed into a shape other than the rectangular shapes shown in FIG. 6.

Fasteners 504 may be of the hook-and-loop type, which includes a flexible hook strip 506 secured to the outer surface of cover 500 and a flexible loop strip 508 secured to the inner surface. Loop strip 508 is preferably liquid-permeable so that its presence does not interfere with the moisture absorbing properties of cover 500 at its peripheral edge. Such hook-and-loop fasteners may be VELCRO® brand hook-and-loop fasteners (Velcro Industries B.V., Curacao, Netherlands) or the like. Alternatively, other fasteners such as buttons, zippers, snaps, hook and eyelet, eyelet and lacing or the like, may be used for fasteners 504.

In the embodiment shown, each panel 502 comprises the basic three-layer structure of a liquid-impermeable outer layer 510, a moisture-absorbing layer 512 and a liquid-permeable inner layer 514. Alternatively, each panel 502 may be modified to include the plural moisture-absorbing layer structure shown in FIG. 5 and/or the radar-influencing layer 308 shown in FIG. 4.

Although the invention has been described and illustrated with respect to the exemplary embodiments thereof, it should be understood by those skilled in the art that the foregoing and various other changed, omissions and additions may be made therein and thereto, without parting from the spirit and scope of the present invention.

What is claimed is:

1. A cover for inhibiting corrosion of a metallic object, comprising:
   a. a first layer having a first face and a second face, said first layer comprising a super-absorbent material adapted to absorb and store moisture;
   b. a second layer located adjacent said first face of said first layer, said second layer being liquid-permeable;
   c. a third layer located adjacent said second face of said first layer, said third layer being liquid-impermeable; and
   d. a vapor corrosion inhibitor region located within or adjacent at least one layer selected from the group consisting of said first layer, said second layer and said third layer, said vapor corrosion inhibitor region comprising a vapor corrosion inhibitor.

2. A cover of claim 1 wherein said super-absorbent material is a hydrogel.

3. A cover of claim 1 wherein said first layer further comprises a fiber matrix.

4. A cover of claim 3 wherein said super-absorbent material is dispersed throughout said fiber matrix.

5. A cover of claim 4 wherein said super-absorbent material is a hydrogel.

6. A cover of claim 1 wherein said third layer is vapor permeable.

7. A cover of claim 6 wherein said third layer comprises an expanded polytetrafluoroethylene material.

8. A cover of claim 6 wherein said third layer comprises a laminate of a woven fabric layer and a breathable urethane layer.

9. A cover of clam 1 wherein said third layer is removably secured to said second layer.

10. A cover of claim 1 wherein said vapor corrosion inhibitor is contained in at least one of said first layer, second and third layer.

11. A cover of claim 1 wherein said vapor corrosion inhibitor region is a layer separate from said first layer, said second layer and said third layer.

12. A cover of claim 1 further including a heating element located within said cover.

13. A cover of claim 12 wherein said heating element comprises an electrical resistance wire located between said second and said third layers.

* * * * *

UNITED STATES PATENT AND TRADEMARK OFFICE
CERTIFICATE OF CORRECTION

PATENT NO.        : 6,833,334 B1                                    Page 1 of 1
APPLICATION NO. : 10/232241
DATED             : December 21, 2004
INVENTOR(S)       : Nabil A. Elkouh and Bruce R. Pilvelait It is certified that error appears in the above-identified patent and that said Letters Patent is hereby corrected as shown below:

In claim 10, column 10, line 14, insert -- layer -- after the word "second," therefor.

Signed and Sealed this

Twenty-first Day of November, 2006

JON W. DUDAS
*Director of the United States Patent and Trademark Office*